United States Patent Office 3,310,606
Patented Mar. 21, 1967

3,310,606
THERMOSETTING PERFLUORINATED DIVINYL ETHER RESINS
Charles Gerhard Fritz, Wilmington, Del., assignor to E. I. du Pont de Nemours and Company, Wilmington, Del., a corporation of Delaware
No Drawing. Filed Aug. 28, 1963, Ser. No. 305,220
21 Claims. (Cl. 260—884)

The present invention relates to polymers of perfluorinated divinyl ethers and, more particularly, to crosslinkable polymers of perfluorinated divinyl ethers and the resulting crosslinked polymers.

It has been known heretofore that perfluorodienes can be polymerized to give rise to polymeric materials. The polymerization of perfluorodienes, however, leads to linear polymers in which the second double bond of the diene is very inert and cannot be readily employed to form crosslinked materials. Thus, not only is direct polymerization to crosslinked resins not possible with the perfluorodienes known heretofore in the prior art, but, furthermore, subsequent crosslinking is extremely difficult and if achieved results in non-fluorocarbon molecular segments which detract from the desirable chemical properties of fluorocarbon materials in general.

It is, therefore, the principal object of the present invention to provide crosslinkable fluorocarbon resins and crosslinked fluorocarbon resins which can be prepared from the crosslinkable fluorocarbon resins by heating or can be obtained directly from the monomer. Other objects will become apparent hereinafter.

The objects of the present invention are accomplished by the homopolymerization of perfluorodivinyl ethers having the formula

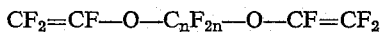

$$CF_2=CF-O-C_nF_{2n}-O-CF=CF_2$$

where $n$ is from 2 to 24 or the copolymerization of such divinyl ethers with other perfluorodivinyl ethers, perfluorovinyl ethers or perfluoroolefins.

The polymeric compositions of the present invention are obtained by the polymerization of the aforesaid divinyl ethers either in bulk or in a liquid medium which is either water or an inert perfluorinated solvent. The polymerization is initiated by perfluorinated free radical forming compounds in perfluorinated reaction environments and by the usual initiators employed for tetrafluoroethylene in aqueous media. The polymerization is believed to occur through addition to either or both vinyl bonds of the divinyl ether. Thus, the polymers of the present invention are characterized by the following structures:

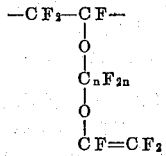

and

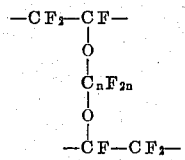

On complete crosslinking, it will be apparent that nearly all of the pendant vinyl groups are converted into polymeric structures such as shown in the second structural formula.

Although it is in general preferred to partially polymerize divinyl ethers of the present invention to form a prepolymer and then to complete the polymerization and crosslinking through an additional polymerization step, it is to be understood that the thermoset resins of the present invention can also be formed directly by a single polymerization. The degree of polymerization and the conversion of the monomers employed to form the fluorocarbon resins of the present invention is readily controlled by the reaction conditions employed in the polymerization. In general, low molecular weight prepolymers are desirable where the monomer mixture contains more than 10% of the divinyl ether. This is generally accomplished by limiting the conversion of the monomer mixture to 10% or less. The resulting liquid to semiliquid materials are actually monomer-polymer mixtures which can be further polymerized to thermoset resins either through heating and/or the addition of compounds giving rise to free radicals. As the divinyl ether content of the monomer mixture is reduced, higher conversions of monomer to polymer can be achieved without resulting in a crosslinked resin. It is, therefore, possible to employ solid resins as prepolymers.

The prepolymers prepared as indicated above can be transformed into thermoset resins by additional heating, particularly where the prepolymer is liquid. Additionally, compounds giving rise to free radicals maybe added to the prepolymer to result, on further heating, in solid thermoset resins. The prepolymers can also be admixed with or dissolved in additional liquid fluorocarbon monomers which contain either one or two vinyl bonds. The ready copolymerizability of the divinyl ethers employed in the present invention allows good control over the degree of crosslinking in the thermoset resin. Thus, if a hard, rigid thermoset is desired the divinyl ether concentration constitutes a higher percentage of the monomer mixture than in the case where a rubbery elastic thermoset resin is desired. However, both types are entirely insoluble and do not melt and, thus, are thermoset.

The divinyl ethers employed in the present invention are obtained by the reaction of diacid fluorides, and, more particularly, perfluorinated diacid fluorides, with hexafluoropropylene epoxide. The resulting adduct has the formula

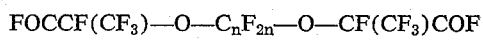

$$FOCCF(CF_3)-O-C_nF_{2n}-O-CF(CF_3)COF$$

and is converted to the divinyl ether by the pyrolysis of the sodium salt of the acid obtained from the difluoride. Specific examples of fluorocarbon divinyl ethers employed in the present invention are perfluorodimethylene-bis(perfluorovinyl ether),
perfluorotrimethylene-bis(perfluorovinyl ether),
perfluorotetramethylene-bis(perfluorovinyl ether),
perfluorohexamethylene-bis(perfluorovinyl ether),
perfluorododecamethylene-bis(perfluorovinyl ether) and
perfluorooctadecamethylene-bis(perfluorovinyl ether).

The fluorocarbon divinyl ethers employed to form thermosetting resins normally contain from 2 to 24 carbon atoms in the perfluoroalkylene radical. Divinyl ethers of still higher molecular weight are semisolids and solids and, thus, do not lend themselves readily to the formation of thermosetting resins.

The divinyl ethers employed in the present invention are preferably copolymerized with monovinyl fluorocarbons which are also liquid and in addition readily polymerized. Particularly preferred groups of comonomers are other perfluorinated divinyl ethers, perfluorovinyl ethers which have the formula $R_fO-CF=CF_2$ where $R_f$ is a perfluoroalkyl radical of one to 12 carbon atoms, and perfluorovinyl polyethers which have the structure

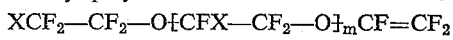

$$XCF_2-CF_2-O\{CFX-CF_2-O\}_mCF=CF_2$$

where X is either a fluorine or a trifluoromethyl radical and $m$ is an integer of one to four. It is also possible however, to employ fluoroolefins as comonomers and particularly such gaseous perfluoroolefins as tetrafluoroethylene and hexafluoropropylene, i.e., perfluoroolefins having the formula $CF_2=CFX$, where X is either a fluorine or a trifluoromethyl radical.

The polymerization of the perfluorinated divinyl ethers is initiated by free radicals. It is, in general, preferred to employ compounds which give rise to chemically inert free radicals so as not to detract from the stability of the resulting resin. Preferred initiators are, therefore, compounds which give rise to fluorinated radicals and which are soluble in the reaction medium such as fluorocarbon peroxides, perfluoroazo compounds and perfluoro compounds containing the N—F bond. Ultraviolet light can also be employed to initiate the polymerization of the perfluorinated divinyl ethers.

The polymerization conditions employed will vary depending on the monomers employed, the degree of polymerization desired, the nature of the initiator used, and the type of polymerization involved, i.e., formation of prepolymer, formation of thermoset resin from prepolymer, or formation of thermoset resin from the monomer. Thus, where liquid monomers are employed the polymerization can generally be carried out at atmospheric or autogenous pressures. In general, the copolymerization with gaseous monomer requires equipment which can be pressurized. Generally temperatures below 100° C. are employed in the polymerization, although temperatures up to 250° C. can be employed. Very active monomers are partially or completely polymerized at room temperature. The formation of the thermoset resins, either from the prepolymer or directly from the monomer requires, in general, higher temperatures than the formation of the prepolymer itself. It is to be noted that in the formation of the thermoset resin from a prepolymer, it is in general desirable to carry out the additional polymerization in the absence of a solvent. Reaction temperatures are in part also dependent on the initiator used, in that the reaction temperature must be high enough to allow the initiator to decompose into free radicals in a concentration sufficient to initiate the polymerization.

The polymerization of the perfluorodivinyl ethers occurs through addition to the double bond with the exception of the perfluorodimethylene bis(perfluorovinyl ether) which can polymerize through the double bond or through intramolecular rearrangement to give rise to units of the following structures

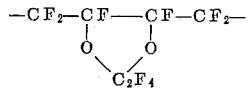

and

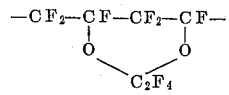

This type of polymerization occurs where the divinyl ether is polymerized in dilute concentration. In bulk polymerization the intramolecular cyclization is suppressed in favor of the standard addition type of polymerization.

The invention is further illustrated by the following examples.

*Example I*

A glass tube sealed at one end was cooled to —80° C. and evacuated. It was then charged with .04 ml. of 2,3-bis(difluoroamino)perfluoro-2-butene and 9 ml. of perfluorodimethylene-bis(perfluorovinyl ether). The tube was sealed and placed in a 50° C. bath. After 30 minutes, solidification had occurred. Heating at 50° C. was continued for 4 hours and followed by 8 hours at 100° C. The thermosetting resin obtained was colorless, clear, stiff and quite tough. It was insoluble in all common solvents and could not be pressed to a film at 300° C. and 30,000 p.s.i. The polymer had a flex modulus of 239,000 p.s.i. at 23° C. and 4,600 p.s.i. at 100° C. It had a heat distortion temperature of 100° C. at 264 p.s.i. After heating at 250° C. for several hours, the flex modulus at 100° C. was improved to 143,000 p.s.i. indicating further curing of the polymer at 250° C. The polymer was completely unaffected by boiling concentrated sulfuric acid, nitric acid, and 20% aqueous potassium hydroxide.

*Example II*

The procedure of Example I was repeated except that a viscous sirup was isolated after 15 minutes heating. This sirup was placed in a mold in an air oven and cured at 100° C. for 5 hours. A thermoset resin with the same properties as that of Example I was obtained.

*Example III*

The sirup prepared by the process of Example II was coated on one surface of a ¾″ stainless steel nut. A second ¾″ stainless steel nut was placed in contact with the first at finger pressure. The assembly was then heated in an air oven for 5 hours at 100° C. under no pressure. The adhesive bond formed in this way required an 8 kg. weight for breaking.

*Example IV*

Into a small glass polymer tube was charged 0.5 gm. of perfluorotrimethylene-bis(perfluorovinyl ether). The tube was cooled to —196° C. and evacuated. There was then introduced 1 cc. of the initiator of Example I in the gaseous state. The tube was re-evacuated, sealed, and slowly heated in a water bath. After 4 hours heating at 100° C. the contents had solidified in part. Heating at 100° C. was continued for an additional 48 hours. The solid plug so attained was hard, brittle, and completely insoluble in common solvents. A differential thermal analysis indicated a transition at 147° C.

*Example V*

The procedure of Example IV was used. The tube was charged with 1.1 cc. of perfluorotetramethylene-bis(perfluorovinyl ether) and 0.03 cc. of liquid 2,3-bis(difluoroamino)perfluoro-2-butene. Heating of the tube at 50° C. was carried out for 6 hours. The temperature was then raised to 70° C. and heating continued for 7 hours. The temperature was then raised to 100° C. and heating was continued for 12 hours. The resin so attained was hard, brittle, and insoluble in common solvents.

*Example VI*

In a quartz carius tube was placed 3 g. of perfluoropentamethylene-bis(perfluorovinyl ether). The tube was cooled in liquid nitrogen, evacuated and sealed. It was then irradiated for 1½ days at 25° C. with a mercury vapor ultra-violet lamp. There was obtained a hard-glass-clear resin that could not be molded at 200° C. at 40,000 p.s.i. The polymer did not undergo extensive decomposition below 310° C.

*Example VII*

In a pyrex carius tube was placed 3 g. of perfluoropentamethylene-bis(perfluorovinyl ether). The tube was cooled in liquid nitrogen, evacuated, charged with 2 mole percent $N_2F_2$ based on monomer and sealed. It was then heated to 80° C. for 16 hours. A hard, clear resin similar to that described in Example VI was obtained.

*Example VIII*

The procedure of Example VII was repeated except that 5 mole percent of $FSO_2NF_2$ was used as initiator and the reaction was run at 100° C. for 36 hours. A polymer similar to that of Example VII was obtained. This polymer was insoluble in all common solvents.

*Example IX*

The procedure of Example VII was repeated except that 3.35 mole percent of 2,3-bis(difluoroamino)perfluoro-2-butene was used as the initiator and the reaction

Example X

The procedure of Example VII was repeated except that 5 mole percent of trifluoromethyl peroxide was used as initiator and the reaction was run at 150° C. for 4 hours. A polymer similar to that of Example VII was obtained.

Example XI

In a quartz carius tube was placed one gram of perfluoropentamethylene - bis(perfluorovinyl ether). The tube was cooled in liquid nitrogen, evacuated, and charged with 2 g. of perfluoromethyl perfluorovinyl ether. After sealing, the tube was irradiated for 20 days at 25° C. with a mercury vapor ultraviolet lamp. There was obtained a quantitative conversion to a crosslinked, clear, hard resin.

Example XII

The procedure of Example VII was followed except that the tube was charged with 2 g. of perfluoropentamethylene-bis(perfluorovinyl ether), 2 g. perfluoropropyl perfluorovinyl ether, and 3 mole percent $N_2F_2$ initiator. After heating 16 hours at 70° C. there was obtained a soft gelatinous polymer. Further heating to 100° C. for 5 hours converted this prepolymer to a hard, flexible thermoset. This polymer was thermally stable at 300° C. and was resistant to boiling concentrated nitric acid, concentrated sulfuric acid, and 20% aqueous potassium hydroxide. It has a density of 2.0 and a refractive index of 1.33.

Example XIII

The procedure of Example XII was followed except that the tube was charged with 0.2 g. of perfluoro-2-propoxypropyl perfluorovinyl ether, 1.8 g. of perfluoropentamethylene-bis(perfluorovinyl ether), 5 mole percent of 2,3-bis(difluoroamino)perfluoro-2-butene as initiator. After heating to 130° C. for 16 hours, there was obtained a tough, flexible, clear thermoset resin.

Example XIV

The procedure of Example XIII was followed except that the tube was charged with 0.5 g. of perfluoropentamethylene-bis(perfluorovinyl ether) and 0.5 g. of perfluorooctyl perfluorovinyl ether and 4 mole percent initiator. After 3 hours heating to 130° C., there was obtained a very viscous liquid prepolymer which after 72 hours further heating at 130° C. was converted to a soft, flexible thermoset resin.

Example XV

The procedure of Example XIV was followed except that the tube was charged with a mixture of one gram of perfluoropentamethylene - bis(perfluorovinyl ether) and 0.5 g. of glass fibers and 6 mole percent initiator. After 10 hours heating at 130° C. there was obtained a stiff, hard thermoset resin.

Example XVI

The procedure of Example XV was followed except that 0.7 g. of aluminum powder was used in place of the glass fiber. There was obtained a hard, stiff thermoset resin.

Example XVII

The procedure of Example XVI was followed except that 0.7 g. of copper powder was used instead of the aluminum. There was obtained a hard, rigid, remarkably tough thermoset resin.

Example XVIII

The procedure of Example XVII was used except that the copper powder was replaced by a copper wire coated with a copolymer of tetrafluoroethylene and hexafluoropropylene. After 3 hours at 130° C. the coated wire could no longer be pulled from the hard, rigid, pot.

Example XIX

Into a platinum tube, sealed at one end, were charged 4 g. of perfluoromethyl perfluorovinyl ether and 0.2 g. of perfluoropentamethylene-bis(perfluorovinyl ether) and 3 mole percent $N_2F_2$. The platinum tube was sealed, placed in a high pressure shaker tube, pressured with nitrogen to 900 atm. and maintained at a temperature of 75° C. for 2 hours. There was obtained 0.8 g. (24% yield) of a viscous oil containing free trifluorovinyl ether groups. Similar conditions can be employed with up to 5 mole percent of the perfluoropentamethylene-bis(perfluorovinyl ether) in the charge without crosslinking.

Example XX

The procedure of Example XIX was repeated except that the platinum tube was charged with 1.43 millimoles of perfluoromethyl perfluorovinyl ether, 0.088 millimole tetrafluoroethylene, 2 mole percent perfluoropentamethylene-bis(perfluorovinyl ether) based on total amount of monovinyl compounds, 9 ml. of perfluorodimethylcyclobutane, and 0.5 mole percent $N_2F_2$ based on the total monomer charge. The shaker tube was pressured to 200 atm. with nitrogen and heated to 75° C. for 1½ hours. There was obtained a 20% yield of a viscous liquid prepolymer containing residual trifluorovinyl ether groups.

Example XXI

An 80 ml. stainless steel shaker tube was dried and flushed with nitrogen. The tube was charged with 1.06 g. of perfluoropentamethylene-bis(perfluorovinyl ether), dissolved in 63 ml. of perfluorodimethylcyclobutane. The tube was closed, cooled to −80° C., evacuated and charged with 20 g. of perfluoromethyl perfluorovinyl ether. The tube was placed in position for shaking and charged with 2 g. of tetrafluoroethylene. When the temperature of the shaker tube had risen to −40° C., 1 mole percent $N_2F_2$ initiator based on total monomer was injected in the tube, and the tube was heated ½ hour at 50° C. and ½ hour at 75° C. Removal under vacuum of the solvent and residual monomers gave 3.45 g. of a soluble, tacky polymer. After drying in vacuo at 100° C. for 16 hours there was obtained a solid polymer with a molecular weight of 15,000 containing residual trifluorovinyl ether groups.

Example XXII

The procedure of Example XXI was followed except that only one gram of tetrafluoroethylene was employed. There was obtained an 8% conversion to a viscous oil of inherent viscosity 0.06 and of molecular weight 8,500 which contained residual trifluorovinyl ether groups.

Example XXIII

In a quartz carius tube were placed 0.4 g. of perfluoropentamethylene-bis(perfluorovinyl ether) and 1.6 g. of a viscous liquid copolymer of perfluoromethyl perfluorovinyl ether and perfluoropentamethylene-bis(perfluorovinyl ether). The tube was cooled to −80° C., evacuated, and sealed. It was then irradiated 120 hours at room temperature with a mercury vapor ultraviolet lamp. There was obtained a hard, rigid, clear thermoset resin that was appreciably tougher than a thermoset resin obtained from perfluoropentamethylene-bis(perfluorovinyl ether) alone under these conditions.

Example XXIV

The procedure of Example XXIII was employed except that the tube was charged with 0.66 g. of perfluoropropyl perfluorovinyl ether and 1.34 g. of a copolymer of perfluoromethyl perfluorovinyl ether and perfluoropentamethylene-bis(perfluorovinyl ether). After irradiation for 120 hours, there was obtained a clear, soft, rubbery thermoset resin.

Example XXV

In a glass carius tube were charged 0.66 g. perfluoropentamethlene-bis(perfluorovinyl ether) and 1.34 g. of a solid terpolymer of perfluoromethyl perfluorovinyl ether, tetrafluoroethylene and perfluoropentamethylene-bis(perfluorovinyl ether). The tube was cooled to −80° C., evacuated, and charged with 3 weight percent 2,3-bis(difluoroamino)perfluoro-2-butene. The tube was sealed and heated to 70° C. for 72 hours. There was obtained a clear, flexible thermoset resin.

Example XXVI

In a glass carius tube were charged 2 g. of a solid terpolymer of perfluoromethyl perfluorovinyl ether, perfluoropentamethylene-bis(perfluorovinyl ether), and tetrafluoroethylene, and 5 weight percent of 2,3-bis(difluoroamino)-perfluoro-2-butene. After heating to 95° C. for 18 hours there was obtained a tough elastomeric thermoset that exhibited excellent thermal stability at 300° C. and resisted the attack of concentrated acids and bases as well as oxidizing agents.

Example XXVII

A series of copolymers of perfluorodimethylene-bis-(perfluorovinyl ether) and perfluoropentamethylene-bis-(perfluorovinyl ether) containing from 10–40 mole percent perfluorodimethylene-bis(perfluorovinyl ether) were prepared by the process of Example I. These polymers were considerably stiffer than the perfluorodimethylene-bis(perfluorovinyl ether) homopolymer and all had heat distortion temperatures (264 p.s.i.) of higher than 100° C. The heat distortion temperature of the 40 mole percent perfluoropentamethylene-bis(perfluorovinyl ether) containing copolymer was in the neighborhood of 200° C.

The foregoing examples have illustrated the formation of thermosetting and thermoset resins of divinyl ethers having the general formula

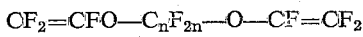

It is to be understood that the perfluorocarbon divinyl ethers encompassed by the formula and not specifically illustrated in the examples can be polymerized by the techniques illustrated in the examples. Contrary to previously known diethylenically unsaturated fluorocarbon compounds, the fluorocarbon divinyl ethers are readily polymerized by reaction of one or both double bonds. The polymerization, furthermore, is readily controlled to give rise to any desired degree of polymerization. Thermoset resins can be formed directly from a monomer or from the prepolymer. The nature of the thermoset resin, furthermore, is readily controlled by copolymerization with other fluorocarbon monomers, particularly those which contain a single double bond. Although the fluorocarbon divinyl ethers can equally well be copolymerized with ethylene or halogen substituted ethylenes, such as ethylene, vinyl fluoride, vinyl chloride, vinylidene fluoride and chlorotrifluoroethylene, the preferred comonomers are completely fluorinated vinyl compounds, since such perfluorinated comonomers do not detract from the outstanding thermal and chemical stability exhibited by the fluorocarbon divinyl ethers, which property maes them extremely useful in many applications.

As indicated hereinabove, the fluorocarbon divinyl ether resins of the present invention are useful as casting resins, coating resins, potting resins and adhesives, particularly in applications involving high temperatures and/or corrosive environments. Contrary to previously known unsaturated fluorocarbon resins the fluorocarbon resins of the present invention are readily converted from liquid prepolymers to thermoset solid resins.

I claim:
1. A thermosetting fluorocarbon addition polymer of a divinyl ether having the formula

where $n$ is a number from 2 to 24, selected from the class consisting of homopolymers of said divinyl ethers, copolymers of said divinyl ethers with each other and copolymers of said divinyl ethers with comonomers selected from the class consisting of perfluoroalkyl perfluorovinyl ethers, perfluorovinyl perfluoroalkoxy polyethers and perfluoroolefins, said thermosetting fluorocarbon containing units having the structure

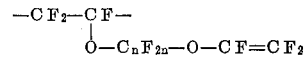

where $n$ is a number from 2 to 24.

2. The thermoset resin of claim 1 wherein the pendant vinyl groups have been polymerized.

3. A thermosetting fluorocarbon addition homopolymer of a divinyl ether having the formula

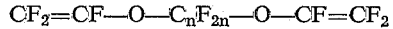

where $n$ is a number from 2 to 24, said homopolymer containing units having the structure

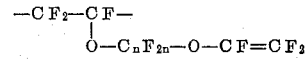

where $n$ is a number from 2 to 24.

4. The thermoset fluorocarbon addition homopolymer of claim 3 wherein the pendant vinyl groups have been polymerized.

5. A thermosetting fluorocarbon addition copolymer of at least two different divinyl ethers having the formula

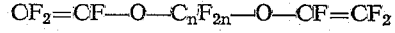

where $n$ is a number from 2 to 24, said copolymer containing units having the structure

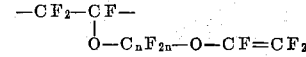

where $n$ is a number from 2 to 24.

6. The thermoset fluorocarbon addition copolymer of claim 5 wherein the pendant vinyl groups have been polymerized.

7. A thermosetting fluorocarbon addition copolymer of a divinyl ether having the formula

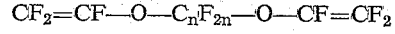

where $n$ is a number from 2 to 24 and a perfluorovinyl ether having the formula $CF_2=CF-O-R_f$, where $R_f$ is a perfluoroalkyl radical of one to 12 carbon atoms, said copolymer containing units having the structure

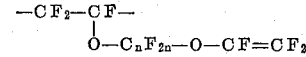

where $n$ is a number from 2 to 24.

8. The thermoset fluorocarbon addition copolymer of claim 7 wherein the pendant vinyl groups have been polymerized.

9. A thermosetting fluorocarbon addition copolymer of a divinyl ether having the formula

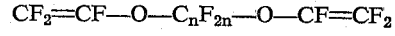

where $n$ is a number from 2 to 24 and a perfluorovinyl perfluoropolyether having the formula

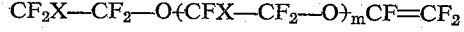

where X is a member of the class consisting of fluorine and the perfluoromethyl radical and $m$ is a number from one to four, said copolymer containing units having the structure

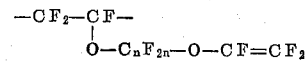

where $n$ is a number from 2 to 24.

10. The thermoset fluorocarbon addition copolymer of claim 9 wherein the pendant vinyl groups have been polymerized.

11. A thermosetting fluorocarbon addition copolymer of a divinyl ether having the formula $$CF_2=CF-O-C_nF_{2n}-O-CF=CF_2$$

where $n$ is a number from 2 to 24 and a perfluoroolefin having the formula $CF_2=CFX$, where X is a member of the class consisting of fluorine and the perfluoromethyl radical, said copolymer containing units having the structure $$\begin{array}{c}-CF_2-CF-\\ |\\ O-C_nF_{2n}-O-CF=CF_2\end{array}$$

where $n$ is a number from 2 to 24.

12. The thermosetting fluorocarbon addition polymer of claim 1 wherein the divinyl ether is perfluorodimethylene-bis(perfluorovinyl ether).

13. The thermosetting fluorocarbon resin of claim 1 wherein the divinyl ether is perfluorotrimethylene-bis(perfluorovinyl ether).

14. The thermosetting fluorocarbon resin of claim 1 wherein the divinyl ether is perfluoropentamethylene-bis(perfluorovinyl ether).

15. The thermosetting fluorocarbon resin of claim 7 wherein the perfluorovinyl ether is perfluoromethyl perfluorovinyl ether.

16. The thermosetting fluorocarbon resin of claim 7 wherein the perfluorovinyl ether is perfluoropropyl perfluorovinyl ether.

17. The thermosetting fluorocarbon resin of claim 9 wherein the perfluorovinyl polyether is perfluoro-2-propoxypropyl perfluorovinyl ether.

18. The thermosetting fluorocarbon resin of claim 11 wherein the perfluoroolefin is tetrafluoroethylene.

19. A solution of the thermosetting fluorocarbon addition polymer of claim 1 in a divinyl ether having the formula $$CF_2=CF-O-C_nF_{2n}-O-CF=CF_2$$

where $n$ is from 2 to 24.

20. A solution of the thermosetting fluorocarbon addition polymer of claim 1 in a perfluorovinyl ether having the formula $$CF_2=CFOR_f$$

where $R_f$ is a perfluoroalkyl group one to 12 carbon atoms.

21. A process for preparing thermosetting fluorocarbon addition polymers which comprises polymerizing a monomer composition selected from the class consisting of divinyl ethers having the formula $$CF=CF_2-O-C_nF_{2n}-O-CF=CF_2$$

where $n$ is a number from 2 to 24 and mixtures of said divinyl ethers with comonomers selected from the class consisting of perfluoroolefins, perfluoroalkyl perfluorovinyl ethers, and perfluorovinyl perfluoroalkoxy polyethers in a liquid medium selected from the class consisting of said monomers in the liquid state and inert perfluorocarbon solvents with a polymerization initiator capable of forming perfluorinated free radicals at the polymerization temperature.

No references cited.

MURRAY TILLMAN, *Primary Examiner.*

J. T. GOOLKASIAN, *Assistant Examiner.*